Oct. 5, 1943.                    A. E. GALIANI                    2,331,021
                                OPHTHALMIC MOUNTING
                                Filed Aug. 26, 1941
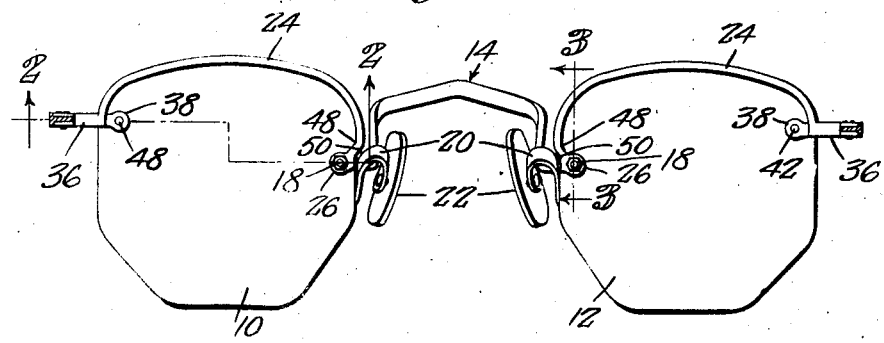
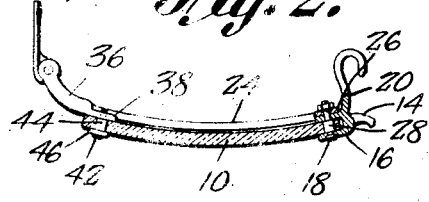
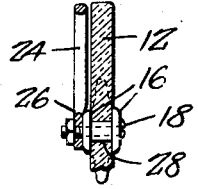
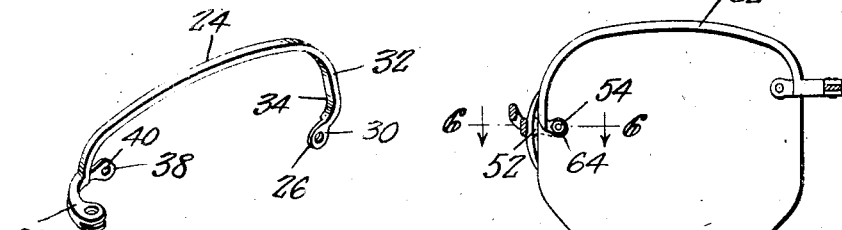
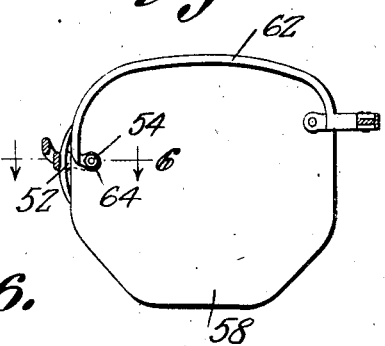
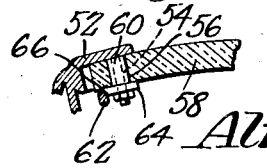
Alfred E. Galiani,
INVENTOR.
BY
Victor J. Evans & Co.
ATTORNEYS Patented Oct. 5, 1943

2,331,021

UNITED STATES PATENT OFFICE 2,331,021

OPHTHALMIC MOUNTING

Alfred E. Galiani, Washington, D. C.

Application August 26, 1941, Serial No. 408,385

1 Claim. (Cl. 88—41)

This invention relates to improvements in ophthalmic mountings.

An object of my invention is to provide a mounting which is attractive in appearance, in which braces are employed and designed for co-action with conventional bridges of the type employed in eye glasses of the rimless type, and in which the braces are attached to the temple pieces to provide a durable and simple construction, with the mounting so devised as to protect the lenses from breakage.

In the accompanying drawing:

Figure 1 is an inside elevational view of a mounting in accordance with my invention;

Figure 2 is a sectional view taken along the line 2—2 of Figure 1;

Figure 3 is a sectional view taken along the line 3—3 of Figure 1;

Figure 4 is a perspective view of one of the braces;

Figure 5 is an inside elevational view of one lens illustrating a modified form of brace structure; and Figure 6 is a sectional view along the line 6—6 of Figure 5.

In the embodiment selected for illustration, Figure 1 illustrates lenses 10 and 12 interconnected by the usual bridge 14. This bridge includes the usual lens straps or clamp members 16, each provided with aligned openings for the reception of a screw 18 extended through an opening in the lens to draw the clamp members together for firmly securing the lens therebetween. The bridge 14 also includes bowed portions 20 to each of which is connected a nose pad 22 through the medium of the usual universal joint.

Each of the lenses is provided with a brace 24 contoured in conformity with the upper contour of the respective lenses and preferably terminating flush with the adjacent edge margins of the respective lenses, with the braces lying adjacent the inner surface of the lenses.

In Figures 2 and 4, the brace 24 illustrated therein includes a relatively thin end margin or flange 26 provided with an opening for the reception of the screw 18, which screw clamps the flange 16 firmly to the strap structure 16, in addition to securing the latter to the lens. The opening in the lens 10 is preferably provided with a protective or cushioning sleeve 28 mounted on the screw 18.

In Figure 4, the face 30 of the flange 26 terminates flush with the edge 32 of the brace, with the opposite edge 34 lying at some distance laterally of the flange 26. This offset arrangement is in such degree as to bring the edge 34 adjacent the lens 10 when the flange 26 is made secure through tightening of the screw 18.

The opposite end of the brace 24 includes a temple piece 36 formed integrally therewith, and this end is provided with a strap 38 engageable with the inner face of the lens. A threaded opening 40 is provided in the strap 38 for the reception of a screw 42 extending through an opening in the temple end of the lens. This opening in the lens is also preferably provided with a cushioning sleeve 44 mounted on the screw 42, with the head of the screw engaging a washer 46 lying against the outer face of the lens.

Since the braces 24 are designed for use in conjunction with conventional bridges, provision is made for accommodating necessary bending of the bowed portions 20, as when fitting the bridge to the nose.

In Figure 1 the braces 24 lie flush with the edges of their respective lenses from the temple pieces 36 around to the points 48, at which points the brace members are bent to extend inwardly of their respective lenses to provide sufficient clearance at 50 to accommodate all necessary bending of the bowed portions 20. The braces 24 are firmly secured in position and lend a pleasing appearance to the eye glasses, in addition to affording protection against breakage. In addition, the braces may be used in conjunction with conventional bridges so as to embody many advantages over mountings of the unit type for eye glasses of the rimless type.

In the unit type of construction, it is necessary to carry an inordinately large number of mountings in order to procure proper fitting to the individual. In forming the temple pieces 36 integrally with the braces 24, I eliminate the extra separate piece common to the mountings of the rimless type.

In Figures 5 and 6, I illustrate a slightly different form of construction, wherein a single lens strap 52 is employed at each lens end of the bridge in lieu of the multiple strap arrangement of Figures 1 and 2. To the strap 52 is fixedly secured one end of a screw 54 extending through a bore 56 in the lens 58. The screw is preferably provided with a cushioning sleeve 60, and the adjacent end of the brace 62 includes a flange 64 lying against the inner face of the lens 58 and bored for the reception of the screw 54. The flange 64 lies flush with the lens-engaging edge 66 of the brace 62.

The thin flange 26 reduces bulk at the point of connection between the bridge and the brace. Further, the temple piece is fixed to the brace so as to greatly strengthen the lens as against an arrangement wherein the temple bar is directly connected with the lens.

Without further elaboration, the foregoing will so fully illustrate my invention, that others may, by applying current knowledge, readily adapt the same for use under various conditions of service.

I claim:

In an ophthalmic mounting, a bridge having lens engaging straps, rim braces having flanges at one end and substantially following portions of the perimeters of the respective lenses along one plane surface thereof, said flanges overlapping the respective straps and being thinner than the thickness of the braces and so positioned thereon as to bring the braces into engagement with the respective plane surfaces, means detachably securing said straps, said flanges and the lenses one with the other, temple pieces integrally joined with the other ends of said braces, second straps joined integrally with said temple pieces and said braces, said second straps having faces lying flush with those portions of the braces engaging said plane surfaces to lie in engagement with the plane surfaces, and means detachably connecting said second straps and the respective lenses one with the other.

ALFRED E. GALIANI.